March 7, 1961 J. A. AUXIER ET AL 2,974,248
NEUTRON-INSENSITIVE BETA-GAMMA DOSIMETER
Filed Sept. 10, 1957

INVENTORS
John A. Auxier
BY George S. Hurst
Richard E. Zedler
ATTORNEY

United States Patent Office

2,974,248
Patented Mar. 7, 1961

2,974,248

NEUTRON-INSENSITIVE BETA-GAMMA DOSIMETER

John A. Auxier, Oak Ridge, George S. Hurst, Knoxville, and Richard E. Zedler, Oak Ridge, Tenn., assignors to the United States of America as represented by the United States Atomic Energy Commission Filed Sept. 10, 1957, Ser. No. 683,189

3 Claims. (Cl. 313—93)

The present invention relates to radiation dosimetry, and more especially to a novel beta-gamma dosimeter which is insensitive to fast neutrons.

Many sources of nuclear radiations, such as nuclear reactors, emit fast neutrons, beta rays, and gamma radiation simultaneously. These radiations are known to produce harmful effects in human tissue and in materials such as semi-conductors, insulators, and the like. The amount of damage produced by equal amounts of these radiations is not the same, however, and may be vastly different, depending upon (1) the type (2) the amount, and (3) the energy of the radiation. Conventionally the radiation dose has been measured in ionization chambers filled with air and having air-equivalent walls; that is, walls which produce substantially the same energy conversion on radiation as does air. It has been impossible in the past to measure the contributions to the total ion current in a chamber of the separate radiations individually. Recoil atoms from fast neutron interaction with matter cause ionization in ionization chambers which cannot be distinguished from that caused by gamma rays or beta particles, so that only a total current can be measured.

Accordingly, it is the primary object of this invention to measure beta and gamma radiation in a strong field of fast neutrons.

Another object of this invention is to measure the physical dose to tissue—that is, the energy which would be absorbed by a small volume of human tissue if placed at a given point in a mixed radiation field.

Yet another object of the invention is to measure the dose received by materials from beta or gamma rays in a field of fast neutrons by providing a counter insensitive to fast neutrons.

These and other objects of the invention are achieved in a novel counter described in detail hereinafter, in a manner which will be best understood when read in conjunction with the appended drawings, wherein.

Figure 3:
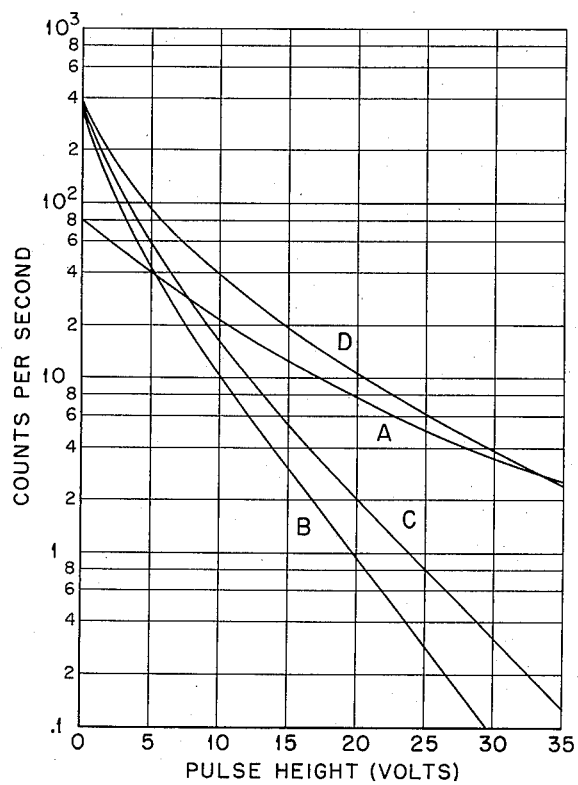
Fig. 3 illustrates several curves of counts per second versus pulse height in volts.

We have discovered that beta and gamma radiation may be counted in the presence of an intense fast neutron field by providing a system having several novel characteristics, as set forth in the following criteria. First, the cavity forming the ionization chamber is made of such dimensions, the gas is so chosen, and the filling gas pressure is sufficiently small so that the probability of producing one ion pair with a thirty kev. electron is substantially less than one. Second, the Bragg-Gray principles are followed: the dimensions of the cavity are made small compared to the range of secondary electrons therein, the wall thickness is made greater than the range of the most energetic secondary electron in the wall, but small compared with the attenuation length of the primary radiation in the wall, and the filling gas in the cavity and the wall material are selected to have approximately the same atomic composition, near that of carbon and oxygen. Third, the counter is operated in the semi-proportional region just below the Geiger region, so that the gas amplification region extends approximately to the walls of the cavity, and fourth, the energy of incident radiation is measured by counting pulses, rather than by measuring ion current.

In accordance with the first criterion, the dimensions of the central cavity are found by solving the equation below to determine the dimensions required such that the probability of energetic electrons producing an ion pair while crossing the chamber volume is small—less than 0.1.

$$P_1 = \frac{\tau}{\lambda_e}$$

$P_1$ is the probability of forming one ion pair by a primary electron in crossing the cavity, $\tau$ is the mean distance, for the case of isotropic particles, to cross the cavity ($\tau = \frac{2}{3}r$), and $\lambda_e$ is the mean free path for ionization by primary electrons.

For a primary electron energy of 30 kev., $\lambda_e$ is approximately 0.01 cm. at atmospheric pressure or 7.6 cm. at 1 mm. Hg pressure of air. For $CO_2$ and some of the other gases, at 1 mm. Hg pressure, $\lambda_e$ reduces to about 5 cm. Then, for $P_1$ $$0.1 = \frac{\tau}{5 \text{ cm.}}$$

and $\tau < 0.5$ cm. But $\tau = \frac{2}{3}r$, so that $r < \frac{3}{8}$. Assuming for example a cylinder radius of 0.25 cm., (diameter 0.5 cm.), then $\tau \approx \frac{2}{3} \times 0.25$, which is smaller than 0.5. Therefore a diameter of 0.5 cm. should be sufficiently small for a practical chamber. The cavity may be a .5×.5 cm. right circular cylinder, the gas $CO_2$, $CS_2$, or the like, and the gas pressure about 1 mm. Hg, for example.

The validity of the fourth criterion may be explained as follows. The energy absorbed in a material $E = NW$, where N is the number of ion pairs formed and W is a constant for the material in which the energy is absorbed. For an isotropic distribution of electrons, the mean distance for crossing the cavity is $\frac{2}{3}R$, where R is the cylinder radius. Since the probability of a fast electron producing one ion pair in crossing the counter is sufficiently small, the probability of forming more than one pair may be neglected. Therefore, if pulses initiated by one ion pair are counted, $E = CW$, where C is the number of counts. A summation of counts is equivalent to the summation of the absorbed energy—the absorbed dose—assuming that the chamber volume and the energy required to produce one ion pair therein are known. Experiments leading to the third above criterion are explained in connection with Fig. 3. The Bragg-Gray principles are well known. See Proc. Royal Society London, A. 156, page 578 (1936).

With a counter system according to the above principles, the fast neutrons which deposit a dose to tissue of one rad will deposit only about $\frac{1}{10}$ rad in the walls of the counter, reducing the neutron sensitivity by a factor of 10. Moreover, the energy deposited in the counter materials will be by recoil atoms, which produce a specific ionization in $CO_2$ at least 100 times that of electrons. But in our system the energy is determined by counting pulses, and the average number of ion pairs per pulse is 100 or more for recoil atoms as compared with 1 for electrons. Hence the ratio of count rate indicated to energy absorption rate is reduced by another factor of 100 or more for neutrons, giving a total reduction of counter sensitivity by a factor of 1000.

Figure 1:
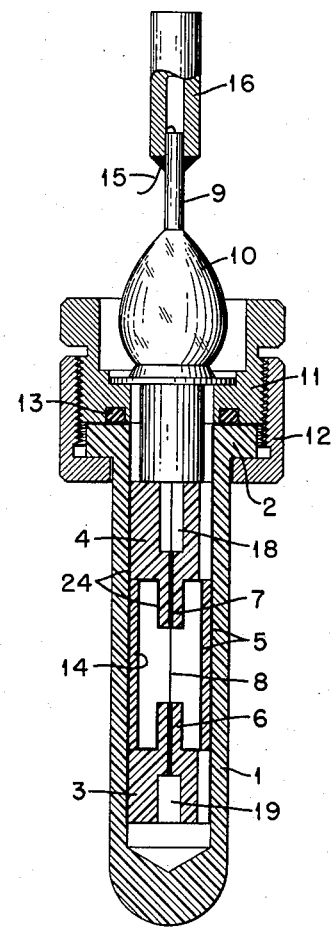
Fig. 1 illustrates an assembled dosimeter.

Referring now to Fig. 1, the cross sectional view of the dosimeter indicates the hollow cylindrical body 1 made up of material having a low effective atomic number such as fluorothene (polychloro-trifluoroethylene), closed at the forward end and provided with a flange type lip 2 at the rear end. Forward insulator 3 and rear insulator 4 are positioned within the body and are spaced apart substantially 7/16" by sleeve 14, which may be 3/16" I.D. The insulators and sleeve may be fabricated from the same material as the body. Confronting projections 6, 7, which extend axially from the insulators, support a thin center electrode 8 which may be 10 mil wire. The distance between the projections may be substantially 3/16".

Electrode wire 8 passes through a hollow well in insulator 4, passes through the hollow tube 9 in Kovar seal 10 and is secured to the end thereof by hollow filling tube 16 which slips over the tube. This joint is then soldered. Seal 10 is securely soldered into a recess in a hollow externally-threaded bushing 11, which engages internally threaded cap 12, urging the lip 2 upward against the bushing 11. An O-ring gasket 13 is provided in an annular recess in the bushing 11 to provide a vacuum seal.

The conductive outer electrode of a radiation counter is provided by coating the inside and outside of sleeve 14 with a coating 5 of a conducting material having a comparatively low atomic weight, such as colloidal graphite (Aquadag or Neolube). The interior walls of body 1 are also coated with the same substance, which coating 24 extends up over the edge of lip 2 so as to make electrical contact with bushing 11. The coating 24 also covers the sides and confronting faces of the insulators 3, 4 and the sides of the projections 6, 7. The forward and rear insulators are provided with passageways 18, 19 to permit all cavities within the chamber to be evacuated and filled with gas.

Figures 2, 4:
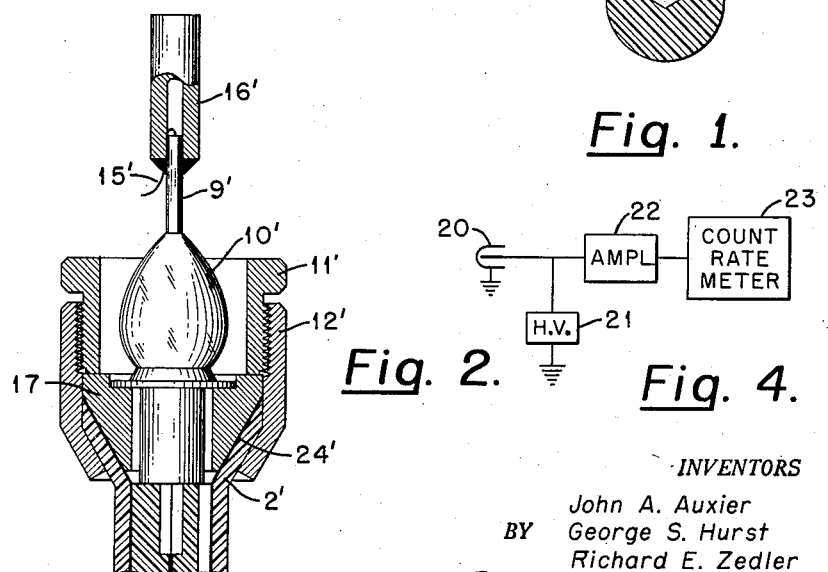
Fig. 2 illustrates an improved seal for one end of the novel dosimeter.
Fig. 4 illustrates a counting system in which the dosimeter is adapted for use.

Referring now to Fig. 2, an improved means of closing and sealing the chamber is illustrated. The lip 2' is flared rather than forming a flange. The Kovar seal 10' containing the central tube 9' is suitably fashioned, as by soldering, to a flare ring 17 which abuts against the inner surface of lip 2'. Internally-threaded cap 12' serves to clamp the lip securely between the cap and ring 17. An internally-apertured, externally-threaded bushing 11' engages the threads on the cap. The interior surface of lip 2' and its associated body member is coated with colloidal graphite, as in Fig. 1.

The ring 17 may be made from a conductor such as brass, while the cap and bushing are formed of a suitable structural material which has a low atomic number, such as aluminum.

In addition to the most important uses as a personnel and radiobiological dosimeter, our invention may be utilized in materials testing studies to ascertain the dose at a given position within a material. If it is desired to make a determination of the dose at a depth of 3 centimeters in a substance, for example, the counter wall may be made from that material and 3 centimeters in thickness. The summation of the counts from the chamber will then equal the summation of the energy at that point, which is equivalent to the dose.

In addition, our invention finds use as a beta ray dosimeter, since even a relatively soft beta ray will lose only a small portion of its energy in the cavity. The wall thickness should be made very small so that energy lost in the wall is not appreciable. This method of obtaining beta ray dose is in distinct contrast to the laborious prior art methods using extrapolation chambers where the chamber volume is continuously made smaller and the data is extrapolated to zero volume and pressure.

Referring now to Fig. 3, curve A is a graph of typical pulse height distribution produced by the gamma radiation associated with 2 rep./hr. from a neutron source (Po-Be), or from 410 mr./hr. from pure gamma emitters ($Co_{60}$, $Ce_{144}$). Curves B, C, and D illustrate the pulse height distribution as a function of the voltage on the counter, where the voltage for curve B is 515 volts, curve C is 530 volts, and curve D is 545 volts. It will be noted that the shape of curve D coincides with the shape of curve A, which was obtained with the same voltage gain (about 100,000). The counter should preferably be operated at the higher voltage (545 volts) for most accurate results, to secure a high gamma pulse height cut off to prevent counting of neutron induced pulses in the large pulse region.

Referring now to Fig. 4, in operation the counter 20 has the shell grounded and the center wire connected to a source of potential 21. In the counter of Fig. 1, the coating 24 is grounded through external means coupled to bushing 11, and the tube 16 is energized by the potential source. Pulses from the counter are amplified by a conventional amplifier 22 and the count-rate is obtained on a standard counting rate meter 23. The amplifier may be of the A-1 type described in Rev. Sci. Inst. 18, 10 (1947), for example. The counting rate may also be obtained by a scaler and timer in the conventional manner.

It will be apparent that we have provided for the first time a radiation counter system which enables us to count beta and gamma radiation in the presence of fast neutrons. It is recognized that other counting gases, counter wall materials, and materials of construction may be utilized in accordance with our teachings above without departing from the scope of our invention as defined in the appended claims.

Having described our invention, we claim:

1. A dosimeter for measuring beta and gamma dose in the presence of fast neutrons comprising a closed cylinder, a liner inside said cylinder defining an internal cylindrical cavity of substantially equal length and diameter, the thickness of said liner walls being greater than the range of secondary electrons therein, a counter filling gas disposed within said cavity at subatmospheric pressure, the length of said cavity being smaller than substantially one-tenth the mean free path for ionization by primary electrons of 30,000 electron volts energy in said gas at said subatmospheric pressure, said liner and said gas having an equivalent atomic number of from 6-16, a conductive coating on the inner surfaces of said liner to define an outer electrode, and an inner electrode axially disposed within said liner.

2. The device of claim 1 wherein said walls are formed from polychlorotrifluoroethylene and said gas is $CO_2$.

3. The device of claim 1 wherein said cavity is a right circular cylinder not larger than substantially .75 cm. in diameter and .75 cm. in height and said gas pressure is substantially 1 mm. Hg.

References Cited in the file of this patent
UNITED STATES PATENTS

| | | |
|---|---|---|
| 2,536,991 | Wollan et al. | Jan. 2, 1951 |
| 2,574,000 | Victoreen | Nov. 6, 1951 |
| 2,875,343 | Birkhoff et al. | Feb. 24, 1959 |

OTHER REFERENCES

Electron and Nuclear Counters by Korff, D. Van Nostrand Co., New York, 1946, pages 18 to 60 and 119 to 134.